US012360602B2

(12) United States Patent
Guo et al.

(10) Patent No.: US 12,360,602 B2
(45) Date of Patent: Jul. 15, 2025

(54) TUNING HAPTIC FEEDBACK OF A DEVICE

(71) Applicant: Microsoft Technology Licensing, LLC, Redmond, WA (US)

(72) Inventors: Qing Guo, Bothell, WA (US); Steven William Ranta, Seattle, WA (US); Edoardo Gastelum Enriquez, Maple Valley, WA (US); Ian Hartman Skop, Seattle, WA (US); James David Wahl, Woodinville, WA (US); Pia Ivonne Santelices, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/454,016

(22) Filed: Aug. 22, 2023

(65) Prior Publication Data

US 2024/0419250 A1 Dec. 19, 2024

Related U.S. Application Data

(60) Provisional application No. 63/508,840, filed on Jun. 16, 2023.

(51) Int. Cl.
*G06F 3/01* (2006.01)
*A63F 13/25* (2014.01)
*G06F 3/0346* (2013.01)

(52) U.S. Cl.
CPC .............. *G06F 3/016* (2013.01); *A63F 13/25* (2014.09); *G06F 3/0346* (2013.01); *A63F 2300/1037* (2013.01)

(58) Field of Classification Search
CPC ........ G06F 3/016; G06F 3/0346; A63F 13/25; A63F 2300/1037; A63F 13/23; A63F 13/24; A63F 13/28; A63F 13/40; A63F 13/428
See application file for complete search history.

(56) References Cited

U.S. PATENT DOCUMENTS

| | | | |
|---|---|---|---|
| 11,360,564 B1 * | 6/2022 | Shin | G06F 3/016 |
| 2004/0147318 A1 * | 7/2004 | Shahoian | G06F 3/016 463/36 |
| 2012/0232780 A1 * | 9/2012 | Delson | A63F 13/285 340/407.1 |
| 2019/0084005 A1 * | 3/2019 | Tsang | H04M 1/026 |

* cited by examiner

*Primary Examiner* — Matthew A Eason
*Assistant Examiner* — Chayce R Bibbee
(74) *Attorney, Agent, or Firm* — Alleman Hall & Tuttle LLP

(57) ABSTRACT

A device configured to generate haptic feedback is disclosed. The device includes a housing, a connector, and a haptic motor. The connector includes a mount end coupled to the housing and a distal end spaced away from the mount end. The haptic motor is coupled to the distal end of the connector. Activation of the haptic motor causes the haptic motor to move relative to the housing to generate the haptic feedback.

16 Claims, 6 Drawing Sheets

Equilibrium Equation:

$$m_1 \ddot{x}_1 + (2c_1 + c_2)\dot{x}_1 - c_2 \dot{x}_2 + (2k_1 + k_2)x_1 - k_2 x_2 = 0$$

$$m_2 \ddot{x}_2 - c_2 \dot{x}_1 + c_2 \dot{x}_2 - k_2 x_1 + k_2 x_2 = f(t)$$

State Space:

$$\rightarrow \begin{bmatrix} m_1 & 0 \\ 0 & m_2 \end{bmatrix} \begin{Bmatrix} \ddot{x}_1 \\ \ddot{x}_2 \end{Bmatrix} + \begin{bmatrix} 2c_1 + c_2 & -c_2 \\ -c_2 & c_2 \end{bmatrix} \begin{Bmatrix} \dot{x}_1 \\ \dot{x}_2 \end{Bmatrix} + \begin{bmatrix} 2k_1 + k_2 & -k_2 \\ -k_2 & k_2 \end{bmatrix} \begin{Bmatrix} x_1 \\ x_2 \end{Bmatrix} = \begin{Bmatrix} 0 \\ f(t) \end{Bmatrix}$$

Laplace Transform:

$$\rightarrow S^2 \begin{bmatrix} m_1 & 0 \\ 0 & m_2 \end{bmatrix} \begin{Bmatrix} X_1(S) \\ X_2(S) \end{Bmatrix} + S \begin{bmatrix} 2c_1 + c_2 & -c_2 \\ -c_2 & c_2 \end{bmatrix} \begin{Bmatrix} X_1(S) \\ X_2(S) \end{Bmatrix} + \begin{bmatrix} 2k_1 + k_2 & -k_2 \\ -k_2 & k_2 \end{bmatrix} \begin{Bmatrix} X_1(S) \\ X_2(S) \end{Bmatrix} = \begin{Bmatrix} 0 \\ F(S) \end{Bmatrix}$$

Fourier Transform:

$$\rightarrow \left( -\omega^2 \begin{bmatrix} m_1 & 0 \\ 0 & m_2 \end{bmatrix} + i\omega \begin{bmatrix} 2c_1 + c_2 & -c_2 \\ -c_2 & c_2 \end{bmatrix} + \begin{bmatrix} 2k_1 + k_2 & -k_2 \\ -k_2 & k_2 \end{bmatrix} \right) \begin{Bmatrix} X_1(\omega) \\ X_2(\omega) \end{Bmatrix} = \begin{Bmatrix} 0 \\ F(\omega) \end{Bmatrix}$$

FRF:

$$\rightarrow \begin{Bmatrix} X_1(\omega) \\ X_2(\omega) \end{Bmatrix} = \left( -\omega^2 \begin{bmatrix} m_1 & 0 \\ 0 & m_2 \end{bmatrix} + i\omega \begin{bmatrix} 2c_1 + c_2 & -c_2 \\ -c_2 & c_2 \end{bmatrix} + \begin{bmatrix} 2k_1 + k_2 & -k_2 \\ -k_2 & k_2 \end{bmatrix} \right)^{-1} \begin{Bmatrix} 0 \\ F(\omega) \end{Bmatrix}$$

$$\rightarrow \begin{Bmatrix} X_1(\omega) \\ X_2(\omega) \end{Bmatrix} = (-\omega^2 [M] + i\omega [C] + [K])^{-1} \begin{Bmatrix} 0 \\ F(\omega) \end{Bmatrix}$$

$$\rightarrow \begin{Bmatrix} X_1(\omega) \\ X_2(\omega) \end{Bmatrix} = \begin{bmatrix} G_{11}(\omega) & G_{12}(\omega) \\ G_{21}(\omega) & G_{22}(\omega) \end{bmatrix} \begin{Bmatrix} 0 \\ F(\omega) \end{Bmatrix}$$

FIG. 5

TUNING HAPTIC FEEDBACK OF A DEVICE

CROSS REFERENCE TO RELATED APPLICATIONS

This application claims priority to U.S. Provisional Patent Application Ser. No. 63/508,840, filed Jun. 16, 2023, the entirety of which is hereby incorporated herein by reference for all purposes.

SUMMARY

A haptic motor may be embedded into a hand-held device, worn device, or other device to provide an end user with instant motion feedback, also referred to as haptic feedback, while interacting with the device. Non-limiting examples of such devices include gaming controllers, mobile game consoles, smartphones, tablet computing devices, gaming steering wheels, virtual reality (VR) controllers, virtual reality headsets, and styluses. In examples where a device is used for a gaming experience, such instant haptic feedback can lead to a more immersive gaming experience. The haptic feedback typically takes the form of a vibration or an impulse. Driven by one or multiple superimposed electrical wave functions, the haptic motor will generate a sinusoidal or impulsive force that accelerates the controller to produce a rumble feel or a hi-definition (HD) crisp shock feedback depending on the frequency of the force.

A device configured to generate a haptic response is disclosed. The device includes a housing, a connector, and a haptic motor. The connector includes a mount end coupled to the housing and a distal end spaced away from the mount end. The haptic motor is coupled to the distal end of the connector. Activation of the haptic motor causes the haptic motor to move relative to the housing to generate the haptic response.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows equations that indicate how the parameters of the model of FIG. 4 relate to each other.

DETAILED DESCRIPTION

Figure 1:
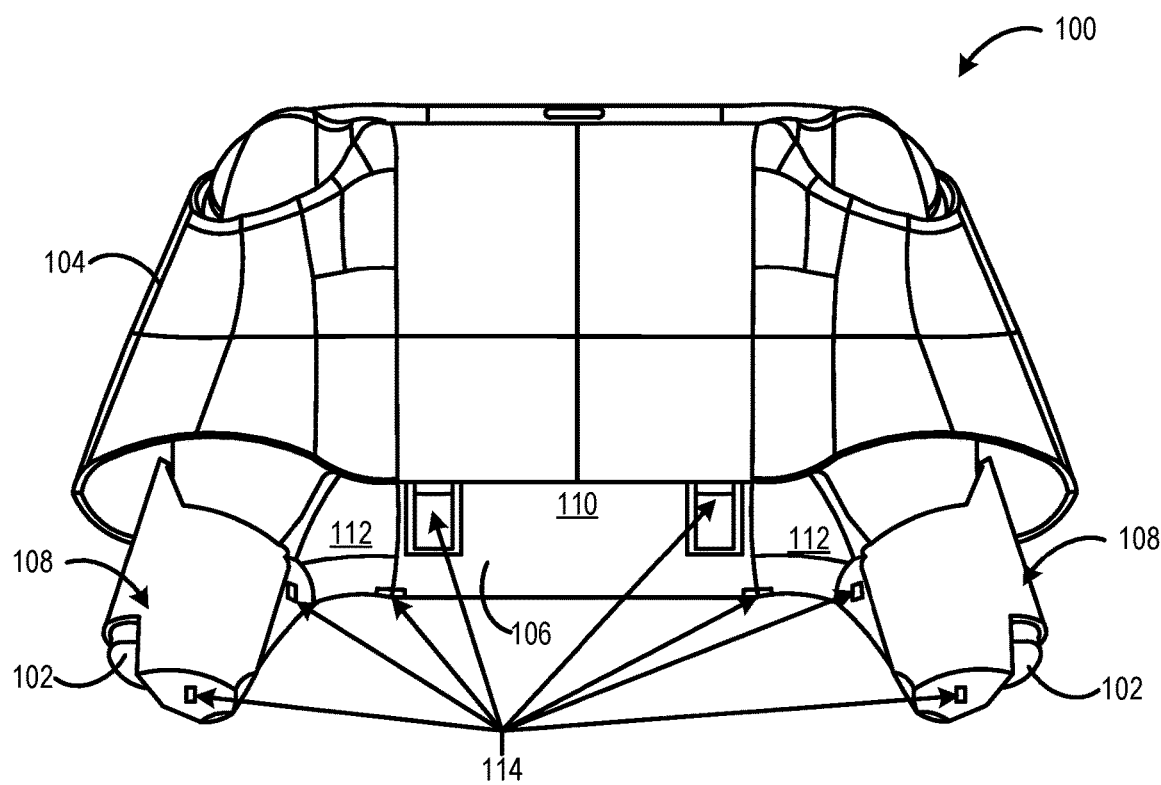
FIG. 1 shows a conventional game controller including haptic motors that are rigidly coupled to a housing of the conventional game controller.

In a conventional device that is capable of providing haptic feedback, a haptic motor is rigidly connected to a housing of the hand-held device, so that a vibration or impulse generated by the haptic motor is directly transferred through the housing to a user's hands as motion feedback. As used herein, a haptic motor includes any apparatus that imparts physical movement to a device. FIG. 1 shows a conventional hand-held device in the form of a game controller 100 including haptic motors 102 that are rigidly connected to a housing 104 of the game controller 100. An internal frame 106 includes a pair of buckets 108. Each bucket 108 contains a corresponding haptic motor 102. The internal frame 106 further includes a central region 110. The buckets are connected to the central region 110 of the internal frame 106 via connectors 112 of the internal frame 106. The internal frame 106 is rigidly coupled to the housing 104 of the game controller 100 via a plurality of rigid connection points 114 that are spread across the internal frame 106. Importantly, the buckets 108 each include a rigid connection point 114 at which the bucket is rigidly coupled to the housing 104, thus preventing the buckets 108, as well as the corresponding haptic motors held by the buckets, from moving relative to the housing.

Figure 2:
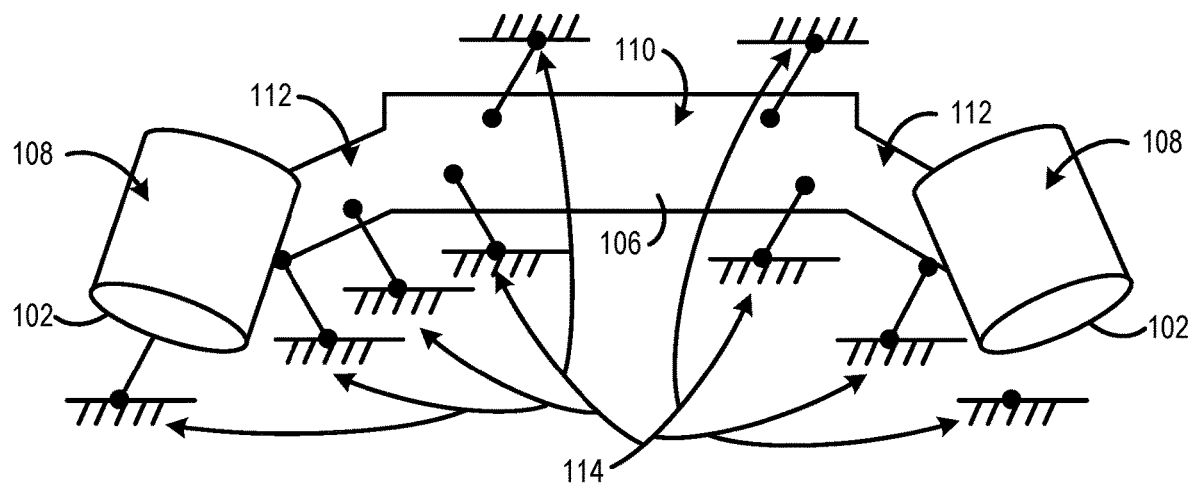
FIG. 2 schematically shows rigid connections between a frame and housing of the conventional game controller of FIG. 1.

FIG. 2 schematically shows the rigid connection points 114 rigidly coupling the internal frame 106 to the housing 104 of the game controller of FIG. 1. In particular, rigid connection points 114 are formed between the buckets 108 and the housing 104, the connectors 112 and the housing, and the central portion 110 of the internal frame 106 and the housing 104. These numerous rigid connection points 114 between the internal frame 106 and the housing 104 cause the haptic motors 102 to be rigidly connected to the housing 104. In this way, a vibration generated by the haptic motors 102 is transferred to the housing 104 via the rigid connection points 114. In other words, the rigid connection points 114 cause the haptic motors 102 and the housing 104 to move together when the haptic motors 102 generate a vibration.

The game controller 100 can be modeled as a single degree of freedom (DOF) first order mass-spring-damper system in which the mass of the housing 104 and the mass of the haptic motors 102 are treated as a single mass (m) and stiffness (K) and dampening factors (C) are externally influenced by a user's hands holding on to the housing 104 of the game controller 100. In such a configuration, excitation of the haptic motors 102 is directly transferred to the housing 104 of the game controller 100, which does not allow for much flexibility or optimization of control of the haptic motors 102.

Accordingly, the present disclosure is directed to a device comprising a housing, a connector including a mount end coupled to the housing and a distal end spaced away from the mount end, and a haptic motor coupled to the distal end of the connector. Activation of the haptic motors causes the haptic motor to move relative to the housing. In some examples, the connector acts as a cantilevered beam that allows the haptic motor to move freely relative to the housing. Such a configuration effectively converts the device into a two DOF 2nd order mass-spring-damper system. In such a configuration, when the haptic motor generates a sinusoidal force excitation resulting from one or more superimposed electrical wave input signals, the hand-held device undergoes a forced vibration whose frequency response function (FRF) includes two resonance peaks located at different frequencies. The location of the resonance peaks on the frequency axis is based on mass (m) and stiffness K) of the two DOF 2nd order mass-spring-damper system, and the amplitude of the resonance peaks is based on a damping factor (C). These parameters can be tuned internally within the hand-held device to provide various benefits.

In one example, the device can be designed to tune the mass (m), the stiffness K), and dampening factor (C), such that when the haptic motor vibrates at a resonance peak of a frequency response function of the haptic motor, the device vibrates at a resonance peak of the frequency response function of the hand-held device. Such tuning to align the component-level resonance peak of the haptic motor with the system-level resonance peak of the hand-held device is believed to boost the maximum vibrational output of the hand-held device relative to a conventional configuration where a haptic motor is rigidly coupled to a housing of a hand-held device, such as the game controller 100 of FIGS. 1-2. Such boosted maximum vibrational output at the resonance peaks allows for a smaller haptic motor to be used relative to a conventional configuration while providing at least the same level of maximum vibrational output. Employing a smaller haptic motor provides the technical benefit of reducing size, weight, cost, and energy consumption of the hand-held device relative to a conventional configuration. Alternatively, a same-sized haptic motor can be used to generate a relatively larger haptic response.

In another example, the device can be designed to tune the mass (m), the stiffness K), and dampening factor (C), such that the two resonance peaks located at different frequencies provide different forms of haptic feedback that are perceived differently. Such different forms of haptic feedback provide the technical benefit of providing a variety of haptic feedback to the user under different operating conditions.

In one example, the device can be tuned such that one resonance peak simulates haptic feedback of a legacy haptic motor of a legacy device (e.g., an Eccentric Rotary Mass (ERM) motor that vibrates at 20 Hz in a legacy game controller). For example, such a configuration may be used for backwards compatibility with legacy video games. Further, the device can be tuned such that the other resonance peak is aligned with a higher frequency that provides high definition (HD) haptic feedback (e.g., at 80 Hz). For example, such haptic feedback could be used for new video games. In some examples, both forms of haptic feedback could be used under different conditions in the same video game (or another interactive experience).

For efficiency of explanation, the following description focusses on hand-held game controllers, but the principles apply to virtually any type of device that includes one or more haptic motors.

Figure 3:
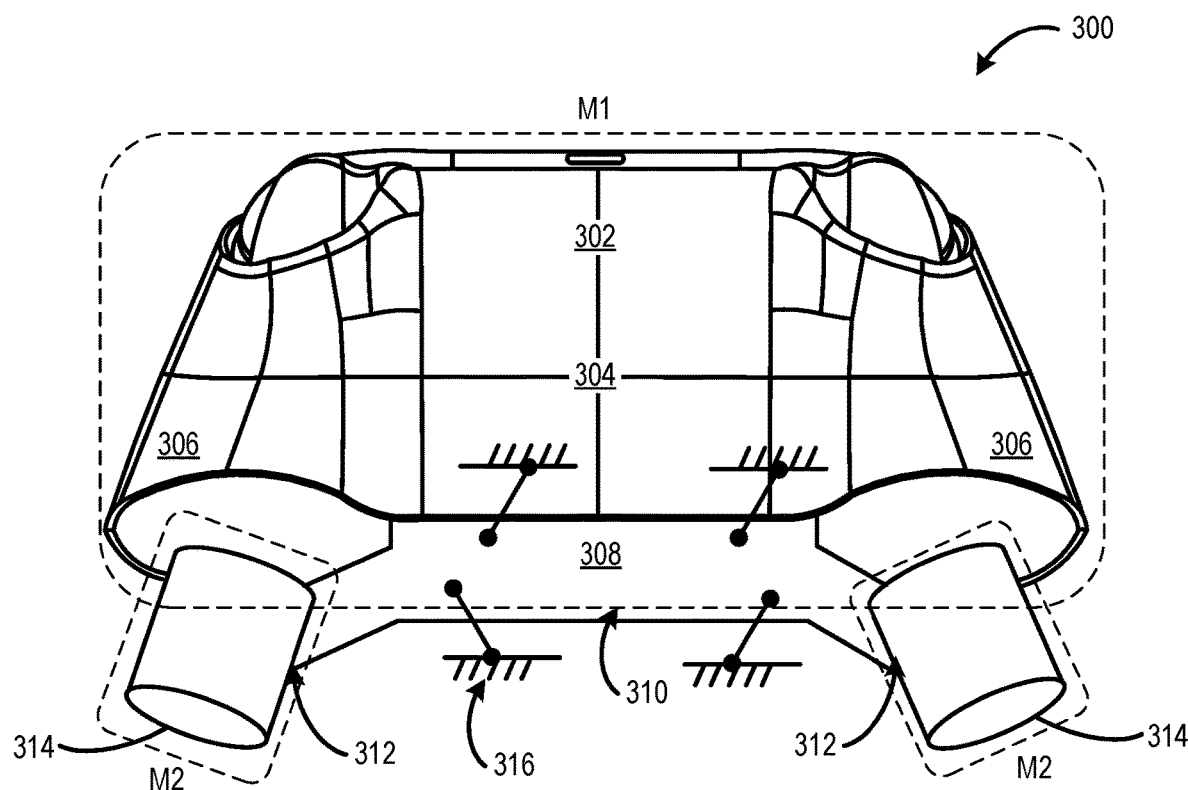
FIG. 3 schematically shows an example game controller including haptic motors that are coupled to distal ends of connectors that allow for the haptic motors to move relative to a housing of the game controller.

FIG. 3 shows an example game controller 300 having a configuration that enables haptic feedback to be tuned. The game controller 300 includes a housing 302. The housing 302 includes a central region 304 and a grip 306 spaced apart from the central region 304. The game controller 300 further includes a connector 308 that is positioned within the housing 302. In some implementations, the connector 308 may take the form of an internal frame. The connector 308 includes a mount end 310 and a distal end 312 spaced way from the mount end 310. A haptic motor 314 is coupled to the distal end 312 of the connector 308. More particularly, in the illustrated implementation, the game controller 300 includes two haptic motors 314 coupled to opposing distal ends 312 of the connector 308. In some examples, the haptic motors 314 may take the form of Linear Resonant Actuators (LRAs) or Voice Coil Actuators (VCAs). In other examples, the haptic motors may include other types of apparatuses that impart physical movement to the game controller. Further, the mount end 310 of the connector 308 is rigidly coupled to the central region 304 of the housing 302, and each of the haptic motors 314 reside within opposing grips 306 of the housing 302. According to this configuration, since the connector 308 is rigidly coupled to the housing at the mount end 310 and not at the distal ends 312, the connector 308 acts as a cantilevered beam that allows for the haptic motors 314 to move relative to the housing 302 when the haptic motors 314 are activated based on receiving an electrical input signal.

The amount of movement between the housing 302 and the haptic motors 314 is at least partially dependent on the distance between the haptic motors 314 and the nearest rigid connection points 316. Increasing the distance increases the amount of relative movement that is possible. In some examples, the distance between a haptic motor and a nearest connection point may be 1 centimeter, although distances of 2, 3, or even more centimeters may be used to achieve a desired frequency response.

Figure 4:
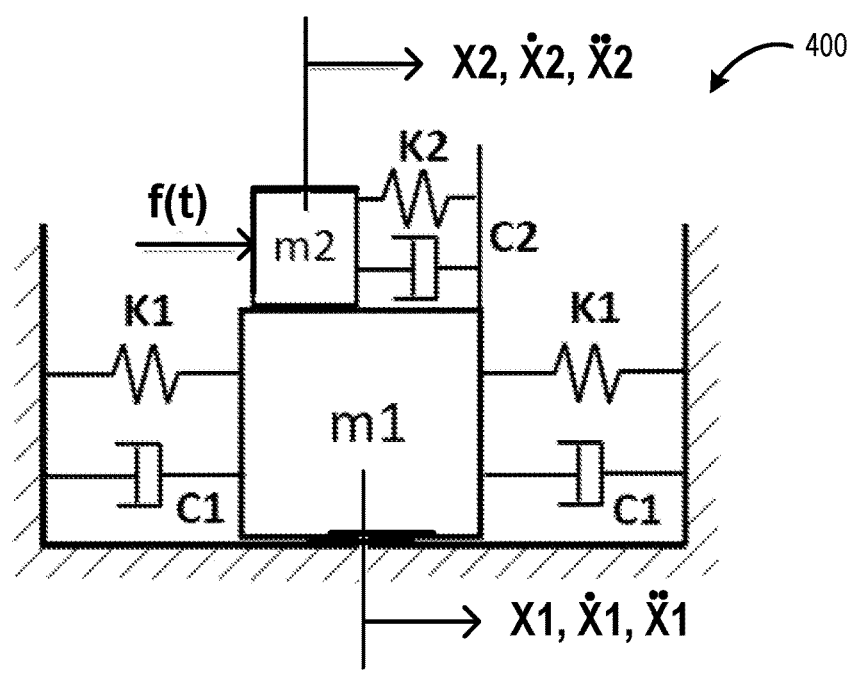
FIG. 4 shows a second order mass-spring-damper theoretical model corresponding to the game controller of FIG. 3.

FIG. 4 shows a second order mass-spring-damper theoretical model 400 corresponding to the game controller 300 of FIG. 3. In the model 400, m1=the mass of the game controller without the haptic motors; m2=the mass of the haptic motors; K1=the stiffness of the game controller interface; K2=the stiffness of the connector (e.g., cantilevered beam); C1=the damping factor of the game controller interface; C2=the damping factor of the connector (e.g., cantilevered beam); f(t)=the sinusoidal input force (generated by haptic motor); x1, $\dot{x}_1$, $\ddot{x}_1$=the amplitude, velocity, and acceleration of the game controller; x2, $\dot{x}_2$, $\ddot{x}_2$=the amplitude, velocity, and acceleration of the haptic motor. K2 and C2 can be tuned based on the connector cross-section geometry and/or material use. In particular, the cross-section geometry governs connector bending rigidity which is proportional to K2. Further, the connector material also determines K2 and C2. In other words, parameters K2 and C2 are combined results from the connector beam length, the connector cross-section geometry, and the connector material.

FIG. 5 shows equations that indicate how the parameters of the model 400 of FIG. 4 relate to each other.

In such a configuration, because the haptic motors 314 move relative to the housing 302, separate forces act on the housing 302 and the haptic motors 314 that allows for the mass of the housing (m1) and the mass of the haptic motors (m2) to be treated separately, thus allowing the stiffness (K2) and the damping factor (C2) to be tunable. Additionally, the stiffness (K1) and the damping factor (C1) from a user's hands holding onto the game controller 300 provide external influence on the second order mass-spring-damper theoretical model 400.

The masses (m1) and (m2), the stiffness (K2) and the dampening factor (C2) can be collectively tuned such that the game controller 300 can provide a wide range of desirable haptic feedback. Various approaches for tuning these parameters of the game controller 300 will be discussed in further detail below.

Figure 6:
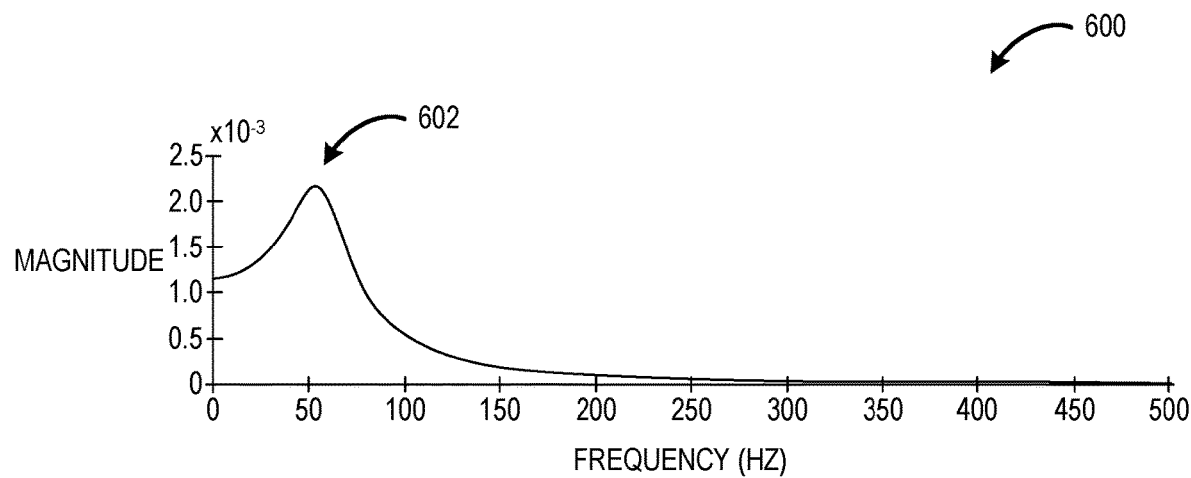
FIG. 6 shows a graph representing an example frequency response function of the conventional game controller of FIG. 1.

As discussed above, a conventional hand-held device including a haptic motor that is fixed to a housing, generates a frequency response function including a single resonance peak when the haptic motor is vibrated. FIG. 6 shows a graph 600 representing an example frequency response function of the conventional game controller 100 of FIGS. 1-2. The frequency response function includes a single resonance peak 602.

Figure 7:
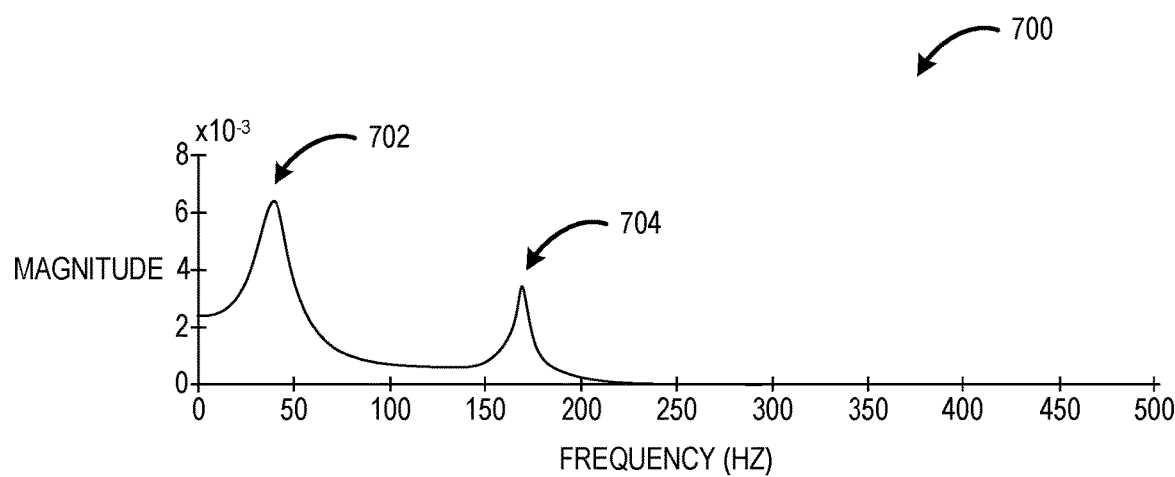
FIG. 7 shows a graph representing an example frequency response function of the game controller of FIG. 3.

FIG. 7 shows a graph 700 representing an example frequency response function of the game controller 300 of FIG. 3. The frequency response function includes a first resonance peak 702 and a second resonance peak 704. The masses (m1) and (m2), the stiffness (K2) and the dampening factor (C2) of the game controller 300 can be collectively tuned to vary the location and/or amplitude of the first and second resonance peaks 702, 704. Assume arbitrary values for K1, K2, C1, and C2 for the game controller to produce haptic feedback corresponding to the frequency response function in the graph 700. In one example, increasing the value of K1 relative to the arbitrary value would shift the first resonance peak 702 to the right in the graph 700, and decreasing the value of K1 would shift the first resonance peak to the left. In another example, increasing the value of K2 relative to the arbitrary value would shift the second resonance peak 704 to the right in the graph 700, and decreasing the value of K2 would shift the second resonance peak to the left. In yet another example, increasing the value of C1 relative to the arbitrary value would reduce the amplitude of the first resonance peak 704, and decreasing C1 would increase the amplitude. In still yet another example, decreasing the value of C2 relative to the arbitrary value would reduce the amplitude of the second resonance peak 704, and increasing the value of C2 would increase the amplitude. The values of these parameters may be set (or dynamically adjusted) to produce any suitable type of haptic feedback.

The game controller can be designed to produce different types of haptic feedback for different purposes. In one example, the game controller 300 can be designed to tune the masses (m1) and (m2), the stiffness (K2), and dampening factor (C2), such that when the haptic motors 314 vibrate at a resonance peak of a component-level frequency response function, the game controller 300 vibrates at a resonance peak of a system-level frequency response function. Such tuning to align the component-level resonance peak of the haptic motor with the system-level resonance peak of the hand-held device is believed to boost the maximum vibrational output of the game controller 300 relative to a conventional configuration where a haptic motor is rigidly coupled to a housing of a hand-held device.

In another example, the game controller 300 can be designed to tune the masses (m1) and (m2), the stiffness (K2), and dampening factor (C2), such that the two resonance peaks located at different frequencies provide different forms of haptic feedback that are perceived differently by the user holding the hand-held device.

In one example, the hand-held device can be tuned such that one resonance peak simulates haptic feedback of a legacy haptic motor of a legacy hand-held device (e.g., an Eccentric Rotary Mass (ERM) motor that vibrates at 20 Hz in a legacy game controller). Such a configuration may be used for backwards compatibility with legacy video games. Further, the hand-held device can be tuned such that the other resonance peak is aligned with a higher frequency that provides HD haptic feedback (e.g., at 80 Hz). For example, such haptic feedback could be used for new video games. In some examples, both forms of haptic feedback could be used under different conditions in the same video game (or another interactive experience).

The game controller 300 may be designed to tune the first and second resonance peaks to a wide range of desirable frequencies and/or amplitudes. The connector 308 may be designed with any suitable material and/or geometric features to achieve desired values for the stiffness (K2) and dampening factor (C2). As a nonlimiting example, a thicker beam geometry may be used to increase the stiffness and the dampening factor. As another example, aluminum may be used to increase a stiffness vs. plastic. This disclosure is not limited to any particular material or geometry, but rather recognizes that once the motor is physically spaced away from where it rigidly connects to the housing, the material(s) and geometry(s) of the structure(s) providing that spacing may be selected to achieve a desired stiffness and dampening factor.

Figure 8:
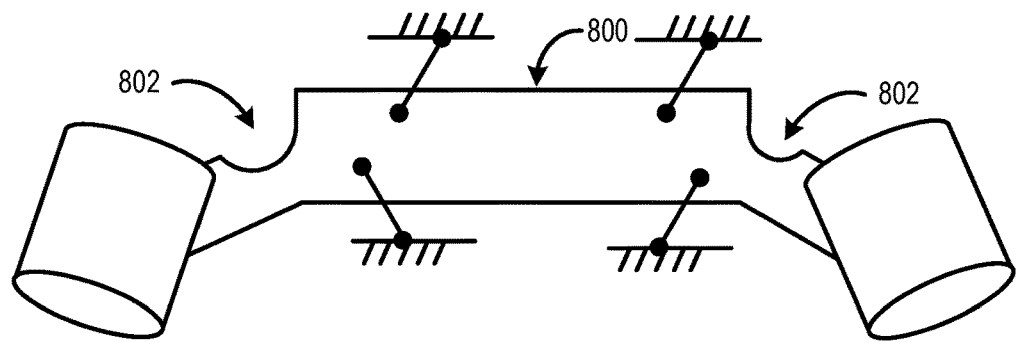
FIGS. 8-10 schematically show example geometric features that can be incorporated into a connector that is coupled to a haptic motor in order to tune a frequency response function of a game controller that is vibrated by the haptic motor.
Figure 9:
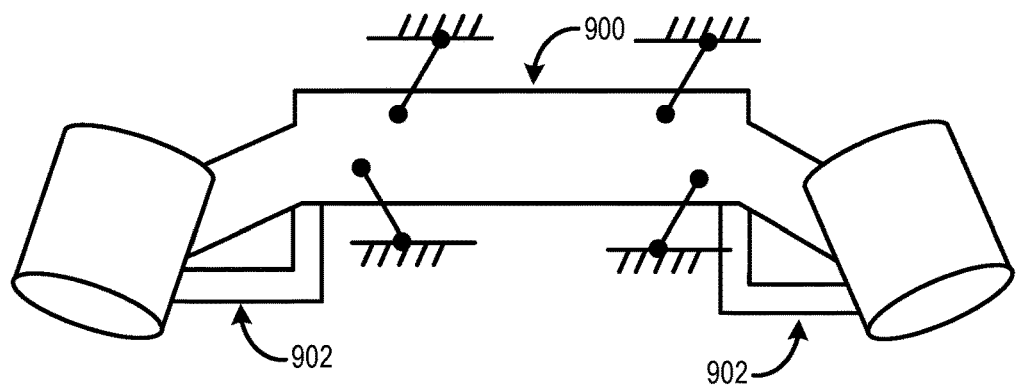
Figure 10:
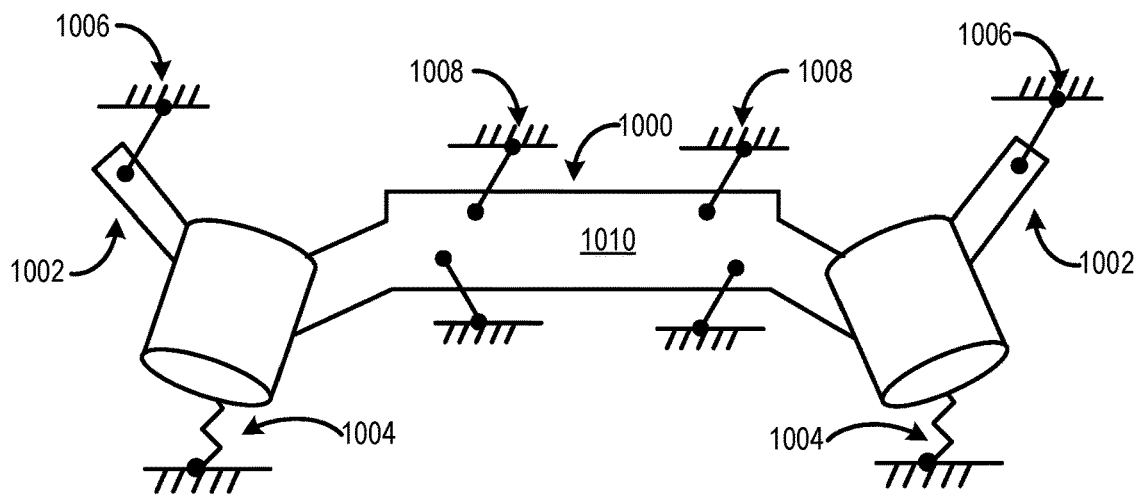

FIGS. 8-10 schematically show example geometric features that can be incorporated into a connector that is coupled to a haptic motor in order to tune a frequency response function of a game controller that is vibrated by the haptic motor.

FIG. 8 schematically shows an example connector 800 including cutouts 802. The cutouts 802 can be incorporated into the connector 800 to reduce stiffness of the connector 800 and/or shift a position of a bending moment on the connector 800.

FIG. 9 schematically shows an example connector 900 including L-brackets 902. The L-brackets 902 can be incorporated into the connector 900 to increase stiffness (K2) of the connector 900 and/or shift a position of a bending moment on the connector 900.

FIG. 10 schematically shows an example connector 1000 including supplemental dampeners 1002 and springs 1004. The supplemental dampeners 1002 can be incorporated into the connector 1000 to increase the stiffness (K2) and the dampening factor (C2). The springs 1004 can be incorporated into the connector 1000 to further increase the dampening factor (C2) of the connector 1000. While this example provides additional rigid connection points 1006 that are distal to rigid connection points 1008 located in a central portion 1010 of the connector 1000, these rigid connection points are spaced apart from the haptic motors and thus allow the haptic motors to move relative to the housing. Further, the springs 1004 allow the haptic motors to move relative to the housing.

These and other features and/or materials may be incorporated into the connector to statically tune the haptic feedback of the game controller 300 in a design phase of the game controller 300. In some examples, such tuning is performed at the time of manufacturing based on the expected use of the device. However, dynamic tuning is also within the scope of this disclosure.

In some implementations, the game controller 300 may be configured to dynamically tune any or all of the masses (m1) and (m2), the stiffness (K2), and dampening factor (C2) during an operation phase of the game controller 300.

Figure 11:
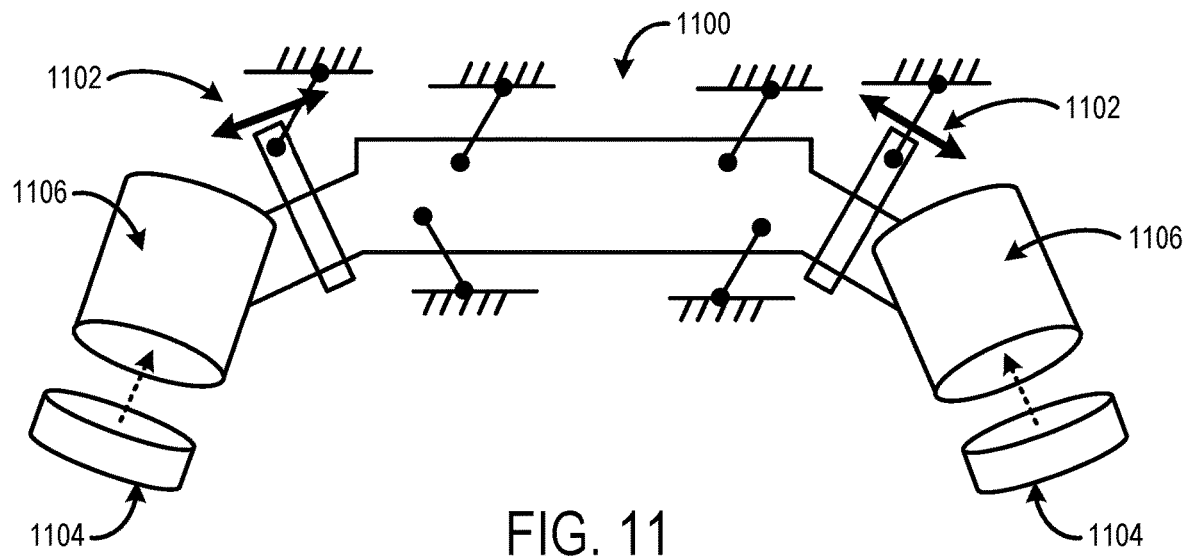
FIG. 11 shows an example connector including a mechanical tuner.
Figure 12:
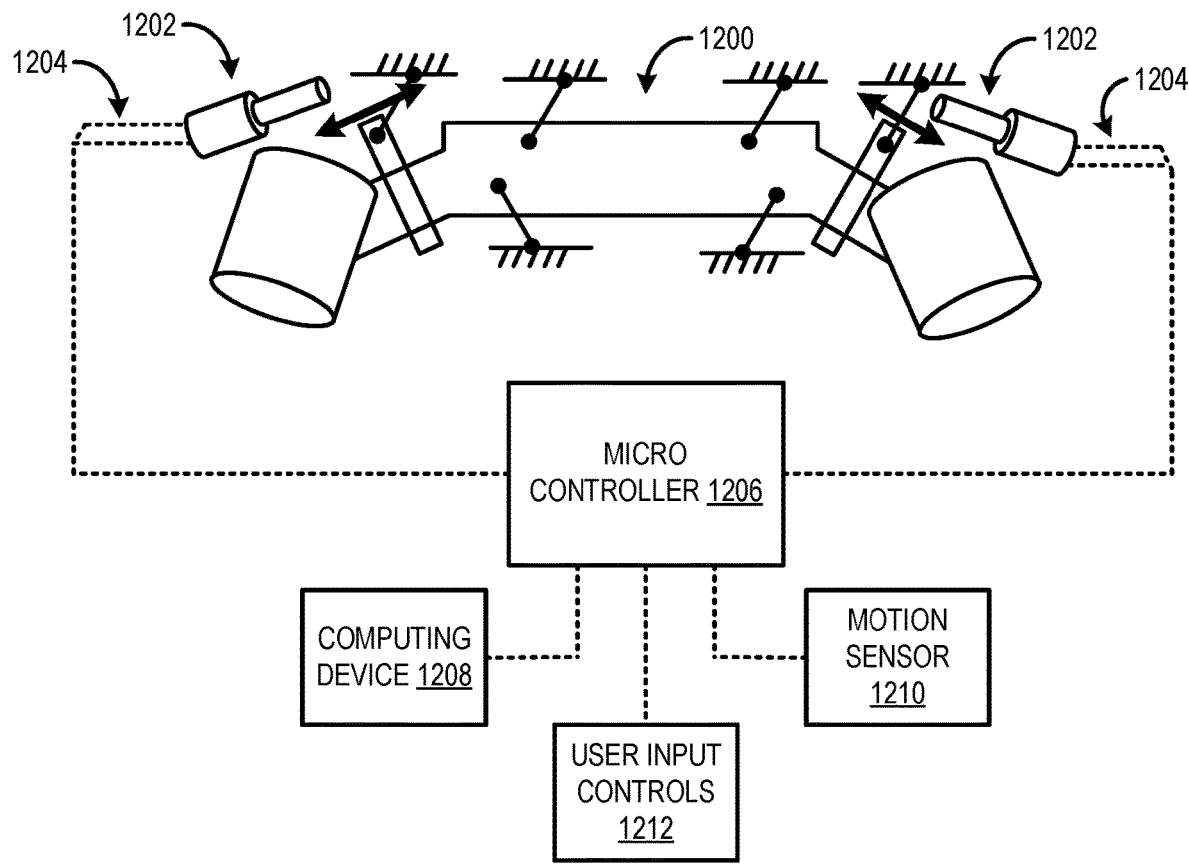
FIG. 12 shows an example connector including an electromechanical tuner.

FIGS. 11-12 show example mechanisms that may be incorporated into a game controller to dynamically tune the haptic feedback of the game controller.

FIG. 11 shows an example connector 1100 including a mechanical tuner 1102. The mechanical tuner 1102 is mechanically adjustable to dynamically adjust one or more of a stiffness and a dampening factor of the connector 1100. In some examples, the mechanical tuner 1102 includes a mechanical pivot that is configured to adjust an effective length of the connector 1100. In other examples, the mechanical tuner 1102 includes a slidable weight. In yet other examples, the mechanical tuner 1102 includes a magnet, and the mechanical tuner 1102 is mechanically adjustable via magnetic actuation of the magnet. The mechanical tuner may take any suitable form to mechanically adjust the connector 1100 to dynamically adjust one or more of a stiffness and a dampening factor of the connector 1100.

In some implementations, the game controller may include features that allows for dynamic tuning of either of the masses (m1) or (m2) to dynamically tune the haptic feedback of the game controller 300. As shown in FIG. 11, the haptic motors 1106 may be configured to receive removable haptic tuning accessories 1104 that are configured to adjust a mass of the haptic motors 1106 and thereby adjust a resonance peak of a frequency response function of the game controller when the game controller is vibrated by the haptic motors 1106. In other examples, removable haptic tuning accessories may be attached to other regions of the game controller to adjust the mass of the game controller for dynamic tuning of the haptic feedback of the game controller.

FIG. 12 shows an example connector 1200 including electromechanical tuners 1202. The electromechanical tuners 1202 have electrical properties that are dynamically adjustable based at least on receiving an electrical signal 1204 from a microcontroller 1206 of the game controller to adjust one or more of the stiffness (K2) and the dampening factor (C2) of the connector 1202.

In one example, the electromechanical tuners 1202 include electromechanical actuators that are configured to change an effective length of the connector 1200 based on receiving the electrical signal 1204. In another example, the electromechanical tuners 1202 may include material that changes stiffness or springiness based on application of the electrical signal 1204 to the material of the electromechanical tuners 1202. The electromechanical tuners 1202 may take any suitable form that allows for dynamic adjustment of the stiffness (K2) and/or the dampening factor (C2) during operation of the game controller.

In some implementations, the microcontroller 1206 may be configured to dynamically adjust the electromechanical tuners 1202 to dynamically tune the haptic feedback of the game controller based on various operating conditions.

In some implementations, the game controller is communicatively coupled to a computing device 1208, such as a game console executing a video game. The microcontroller 1206 may be configured to receive a control signal from the computing device 1208 indicating an operating condition of the computing device 1208, such as a game state of the video game. The microcontroller 1206 may be configured to send an electrical signal to the electromechanical tuners 1204 based at least on the operating condition of the computing device 1208. The electromechanical tuners 1204 may be configured to adjust the stiffness (K2) and/or the dampening factor (C2) of the connector 1200 based on receiving the electrical signal to dynamically tune the haptic feedback of the game controller based on the operation condition of the computing device 1208.

In some implementations, the game controller may include a motion sensor 1210, such as an inertial measurement unit (IMU). The microcontroller 1206 may be configured to receive an electrical signal encoding motion data from the motion sensor 1210. The microcontroller 1206 may be configured to send an electrical signal to the electromechanical tuners 1204 based at least on the motion data. The electromechanical tuners 1204 may be configured to adjust the stiffness (K2) and/or the dampening factor (C2) of the connector 1200 based on receiving the electrical signal to dynamically tune the haptic feedback of the game controller based on the motion data.

The game controller may include one or more user input controls 1212. In some implementations, the microcontroller 1206 is configured to receive user input via the one or more user input controls 1212. The user input indicates user adjustment of haptic feedback of the game controller. The microcontroller 1206 may be configured to send an electrical signal to the electromechanical tuners 1202 based at least on the user input received via the one or more user input controls 1212. The electromechanical tuners 1204 may be configured to adjust the stiffness (K2) and/or the dampening factor (C2) of the connector 1200 based on receiving the electrical signal to dynamically tune the haptic feedback of the game controller based on the user input.

The concepts described herein enhance a haptic response of a device by incorporating haptic subcomponents into a moving or flexible mechanical architecture of the device that allows for the haptic motor to move relative to a housing of the device. This allows for a lower cost, weight, size, and energy consuming haptic component to perform similar to a larger haptic component, or to enhance the haptic response of the larger haptic component.

Although the concepts related to tuning haptic feedback are discussed mostly in the context of a game controller, it will be appreciated that these concepts are broadly applicable to any suitable type of device that includes haptic motors that provide haptic feedback.

In an example, a device comprises a housing, a connector including a mount end coupled to the housing and a distal end spaced away from the mount end, and a haptic motor coupled to the distal end of the connector, wherein activation of the haptic motor causes the haptic motor to move relative to the housing. In this example and/or other examples, activation of the haptic motor may generate a sinusoidal excitation force that is transferred through the connector to the device to vibrate the device according to a frequency response function that includes two resonance peaks. In this example and/or other examples, the connector may have a stiffness and a dampening factor that are tuned such that when the haptic motor vibrates at a resonance peak of a frequency response function of the haptic motor, the device vibrates at a resonance peak of the frequency response function of the device. In this example and/or other examples, the housing may include a central region and a grip spaced apart from the central region, the mount end of the connector may be coupled to the central region of the housing, and the haptic motor may reside within the grip of the housing. In this example and/or other examples, the connector may include a mechanical tuner that is mechanically adjustable to dynamically adjust one or more of a stiffness and a dampening factor of the connector. In this example and/or other examples, the mechanical tuner may include a mechanical pivot. In this example and/or other examples, the mechanical tuner may include a slidable weight. In this example and/or other examples, the mechanical tuner may include a magnet, and the mechanical tuner may be mechanically adjustable via magnetic actuation of the magnet. In this example and/or other examples, the device may be configured to receive a removable haptic tuning accessory configured to adjust a mass of the device and thereby adjust a resonance peak of a frequency response function of the device when the device is vibrated by the haptic motor. In this example and/or other examples, the connector may include an electromechanical tuner having electrical properties that are dynamically adjustable based at least on an electrical signal to adjust one or more of a stiffness and a dampening factor of the connector. In this example and/or other examples, the device may further comprise a controller configured to send the electrical signal to the electromechanical tuner to dynamically adjust one or more of the stiffness and the dampening factor of the connector. In this example and/or other examples, the device may be communicatively coupled to a computing device, and the controller may be configured to receive a control signal indicating an operating condition of the computing device and send the electrical signal to the electromechanical tuner based at least on the operating condition of the computing device. In this example and/or other examples, the device may further comprise a motion sensor, and the controller may be configured to receive a sensor signal encoding motion data from the motion sensor and send the electrical signal to the electromechanical tuner based at least on the motion data received from the motion sensor. In this example and/or other examples, the device may further comprise one or more user input controls, and the controller may be configured to receive a user input signal via the one or more user input controls, the user input signal controlling adjustment of vibration of the device, and the controller may be configured to send the electrical signal to the electromechanical tuner based at least on the user input signal received via the one or more user input controls.

In another example, a device comprises a housing, a connector having a mount end coupled to the housing and a distal end spaced away from the mount end, wherein the connector includes an electromechanical tuner having electrical properties that are dynamically adjustable based at least on an electrical signal to adjust one or more of a stiffness and a dampening factor of the connector, a haptic motor coupled to the distal end of the connector, and a controller configured to send the electrical signal to the electromechanical tuner to dynamically adjust one or more of the stiffness and the dampening factor of the connector. In this example and/or other examples, the device may be communicatively coupled to a computing device, and the controller may be configured to receive a control signal indicating an operating condition of the computing device and send the electrical signal to the electromechanical tuner based at least on the operating condition of the computing device. In this example and/or other examples, the device may further comprise a motion sensor, and the controller may be configured to receive a sensor signal encoding motion data from the motion sensor and send the electrical signal to the electromechanical tuner based at least on the motion data received from the motion sensor. In this example and/or other examples, the device may further comprise one or more user input controls, and the controller may be configured to receive user input via the one or more user input controls indicating user adjustment of vibration of the device and send the electrical signal to the electromechanical tuner based at least on the user input received via the one or more user input controls. In this example and/or other examples, activation of the haptic motor may generate a sinusoidal excitation force that is transferred through the connector to the device to vibrate the device according to a frequency response function that includes two resonance peaks.

In yet another example, a device comprises a housing, a connector including a mount end coupled to the housing and a distal end spaced away from the mount end, and a haptic motor coupled to the distal end of the connector, wherein activation of the haptic motor causes the haptic motor to move relative to the housing and generate a sinusoidal excitation force that is transferred through the connector to the device to vibrate the device according to a frequency response function that includes two resonance peaks.

It will be understood that the configurations and/or approaches described herein are exemplary in nature, and that these specific embodiments or examples are not to be considered in a limiting sense, because numerous variations are possible. The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A device comprising:
a housing;
a connector including a mount end coupled to the housing and a distal end spaced away from the mount end;
a mechanical tuner coupled to the connector; and
a haptic motor coupled to the distal end of the connector to form a cantilevered arrangement having a flexible mechanical architecture, wherein activation of the haptic motor causes the haptic motor to move freely at the distal end of the connector relative to the housing, wherein the mechanical tuner is mechanically adjustable to dynamically adjust one or more of a stiffness and a dampening factor of the connector to thereby adjust a frequency response function of the device upon activation of the haptic motor.

2. The device of claim 1, wherein activation of the haptic motor generates a sinusoidal excitation force that is transferred through the connector to the device such that the sinusoidal excitation force causes the device to vibrate according to the frequency response function that includes two resonance peaks.

3. The device of claim 2, wherein the stiffness and the dampening factor of the connector are tuned such that when the haptic motor vibrates at a resonance peak of the frequency response function of the haptic motor, the device vibrates at a resonance peak of the frequency response function of the device.

4. The device of claim 1, wherein the housing includes a central region and a grip spaced apart from the central region, wherein the mount end of the connector is coupled to the central region of the housing, and wherein the haptic motor resides within the grip of the housing.

5. The device of claim 1, wherein the mechanical tuner includes a mechanical pivot.

6. The device of claim 1, wherein the mechanical tuner includes a slidable weight.

7. The device of claim 1, wherein the mechanical tuner includes a magnet, and wherein the mechanical tuner is mechanically adjustable via magnetic actuation of the magnet.

8. The device of claim 1, wherein the device is configured to receive a removable haptic tuning accessory configured to adjust a mass of the device and thereby adjust a resonance peak of a frequency response function of the device when the device is vibrated by the haptic motor.

9. A device comprising:
a housing;
a motion sensor configured to output a sensor signal encoding motion data of the device;
a connector having a mount end coupled to the housing and a distal end spaced away from the mount end, wherein the connector includes an electromechanical tuner having electrical properties that are dynamically adjustable based at least on an electrical signal to adjust one or more of a stiffness and a dampening factor of the connector;

a haptic motor coupled to the distal end of the connector to form a cantilevered arrangement having a flexible mechanical architecture, wherein activation of the haptic motor causes the haptic motor to move freely at the distal end of the connector relative to the housing; and a controller configured to receive the sensor signal from the motion sensor, generate the electrical signal based at least on the motion data encoded in the sensor signal, and send the electrical signal to the electromechanical tuner to dynamically adjust one or more of the stiffness and the dampening factor of the connector based at least on the motion data.

10. The device of claim 9, wherein the device is communicatively coupled to a computing device, and wherein the controller is configured to receive a control signal indicating an operating condition of the computing device and send the electrical signal to the electromechanical tuner based at least on the operating condition of the computing device.

11. The device of claim 9, further comprising one or more user input controls, and wherein the controller is configured to receive user input via the one or more user input controls indicating user adjustment of vibration of the device and send the electrical signal to the electromechanical tuner based at least on the user input received via the one or more user input controls.

12. The device of claim 9, wherein activation of the haptic motor generates a sinusoidal excitation force that is transferred through the connector to the device such that the sinusoidal excitation force causes the device to vibrate according to a frequency response function that includes two resonance peaks.

13. A device comprising:
a housing;
a connector including a mount end coupled to the housing and a distal end spaced away from the mount end;
an electromechanical tuner having electrical properties that are dynamically adjustable based at least on an electrical signal to adjust one or more of a stiffness and a dampening factor of the connector;

a haptic motor coupled to the distal end of the connector, wherein activation of the haptic motor causes the haptic motor to move relative to the housing and generate a sinusoidal excitation force that is transferred through the connector to the device such that the sinusoidal excitation force causes the device to vibrate according to a frequency response function that includes two resonance peaks; and a controller configured to send the electrical signal to the electromechanical tuner to dynamically adjust one or more of the stiffness and the dampening factor of the connector to adjust a location and/or amplitude of at least one or both of the two resonance peaks.

14. The device of claim 13, wherein the device is communicatively coupled to a computing device, and wherein the controller is configured to receive a control signal indicating an operating condition of the computing device and send the electrical signal to the electromechanical tuner based at least on the operating condition of the computing device.

15. The device of claim 13, further comprising a motion sensor, and wherein the controller is configured to receive a sensor signal encoding motion data from the motion sensor and send the electrical signal to the electromechanical tuner based at least on the motion data received from the motion sensor.

16. The device of claim 13, further comprising one or more user input controls, and wherein the controller is configured to receive a user input signal via the one or more user input controls, the user input signal controlling adjustment of vibration of the device, and wherein the controller is configured to send the electrical signal to the electromechanical tuner based at least on the user input signal received via the one or more user input controls.

* * * * *